(12) United States Patent  (10) Patent No.: US 9,062,780 B2
Newman et al.  (45) Date of Patent: Jun. 23, 2015

(54) PRESSURE REGULATOR WITH SLIDE-MOUNT LOBES

(75) Inventors: Shmuel Dovid Newman, Redondo Beach, CA (US); Jeffrey O. Brown, North Logan, UT (US)

(73) Assignee: YSN Imports, Inc., Gardena, CA (US)

( * ) Notice: Subject to any disclaimer, the term of this patent is extended or adjusted under 35 U.S.C. 154(b) by 665 days.

(21) Appl. No.: 13/440,905

(22) Filed: Apr. 5, 2012

(65) Prior Publication Data

US 2012/0255632 A1  Oct. 11, 2012

Related U.S. Application Data

(60) Provisional application No. 61/472,089, filed on Apr. 5, 2011.

(51) Int. Cl.
*F16K 17/14* (2006.01)
*F16K 1/30* (2006.01)
*G05D 16/10* (2006.01)

(52) U.S. Cl.
CPC .............. *F16K 1/307* (2013.01); *G05D 16/103* (2013.01)

(58) Field of Classification Search
CPC ....................................................... F16K 1/307
USPC ......... 137/535, 68.23, 613, 614, 614.01, 588, 137/583, 505, 506; 251/149
See application file for complete search history.

(56) References Cited

U.S. PATENT DOCUMENTS 6,851,447 B1 *  2/2005  Carroll ..................... 137/505.25

* cited by examiner

*Primary Examiner* — Kevin Lee
*Assistant Examiner* — P. Macade Nichols
(74) *Attorney, Agent, or Firm* — Lance M. Pritikin

(57) ABSTRACT

A pressure regulator for regulating the pressure of a fluid from an associated pressure reservoir includes a regulator body housing a shuttle assembly and supporting a multiplicity of radially-distributed service lobes. Each service lobe includes features in fluid communication with one or more chambers within the regular body, and performs a particular function relating to the pressure and contents within those chambers. Such lobes may include one or more of a bias lobe for regulating pressure within the shuttle bias chamber, a fill lobe through which the reservoir may be filled, a gauge lobe which displays the pressure within the reservoir, and a relief lobe including one or more burst disks to relieve over pressurization in the reservoir or output chamber of the regulator. Each service lobe may slideably engage a respective interface on the regulator body, and be releasably secured there by way of a threaded retainer.

9 Claims, 8 Drawing Sheets

PRESSURE REGULATOR WITH SLIDE-MOUNT LOBES

RELATED APPLICATIONS

This application claims the benefit of U.S. Provisional Application No. 61/472,089, filed on Apr. 5, 2011, the contents of which are incorporated by this reference in its entirety for all purposes as if fully set forth herein.

TECHNICAL FIELD

The present invention relates generally to pressure regulators. More particularly, the present invention relates to regulators for regulating gas from a tank that contains compressed gas to a paintball gun, marker, or other application designed to utilize or be activated by gas at a controlled pressure.

BACKGROUND

Pressure regulators are commonly relied on to reduce the pressure of a gas as it is delivered from a pressurized gas reservoir, such as a portable compressed air tank, to an application device, such as a paintball marker. Paintball markers may feature a gas pressure regulator directly connected to the mouth of a tank designed to store gasses at very high pressures, typically between 3000-4500 psi. Commonly referred to as "tank regulators," these gas pressure regulators may reduce the pressure of the gas delivered from the tank down to, for example, 600-800 psi before the gas enters portions of the paintball marker for use in firing a projectile.

SUMMARY

Certain embodiments of a pressure regulator may comprise a regulator body, a shuttle assembly, a fill lobe, a bias lobe, a relief lobe, and a gauge lobe. The regulator body may have a first end, a second end, and a main bore extending therebetween along a main axis. The second end may be adapted to be placed in fluid communication with a reservoir of pressurized gas, such as a portable compressed air tank for use with paintball marker applications. The shuttle assembly is received within the main bore for axial movement between a fluid release configuration and a fluid retention configuration. The main bore may cooperate with the shuttle assembly to define a bias chamber, and may also cooperate with the shuttle assembly and retainer assembly to define an output chamber. The regulator body may outwardly include a plurality of lobe interfaces generally radially distributed about the main axis. Each lobe interface may include a respective port in fluid communication with the second end. Each of the lobes may be being axially slidably engaged with a respective lobe interface and axially releasably restrained thereat. The bias lobe may include a pilot regulator in fluid communication generally between the second end and the bias chamber for regulating a bias pressure within the bias chamber. A relief lobe may include a high-pressure burst disk in fluid communication between the second end and ambient air. A gauge lobe may include a pressure gauge assembly in pressure-indicating fluid communication with the second end. A fill lobe may include a fill plug in fluid communication with the second end.

Embodiments of a pressure regulator in accordance with the present invention may further comprise a sleeve element and a retainer assembly. A regulator body may include a first portion at generally the first end. The sleeve element may include an externally threaded portion and a radially-extending sleeve flange, and may be in receiving engagement with the first end. The retainer assembly may include a retainer element threadably received by the main bore generally at the first end and thereby axially releasably restrain one or more of the fill lobe, bias lobe, relief lobe and gauge lobe in engagement with their respective lobe interfaces and axially releasably restraining the sleeve element in its receiving engagement with the first portion.

BRIEF DESCRIPTION OF THE DRAWINGS

Further advantages of the present invention may become apparent to those skilled in the art with the benefit of the following detailed description of the preferred embodiments and upon reference to the accompanying drawings in which.

DETAILED DESCRIPTION OF THE PREFERRED EMBODIMENTS

Figure 1:
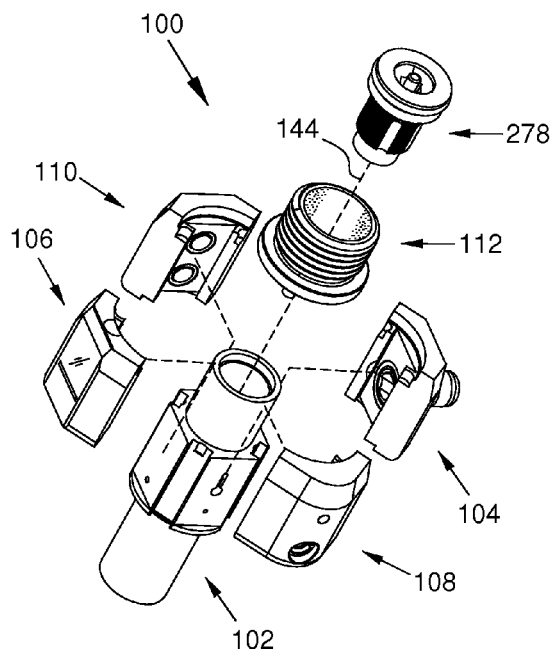
FIG. 1 is a diagrammatic exploded view of a pressure regulator in accordance with the present invention.
Figure 2:
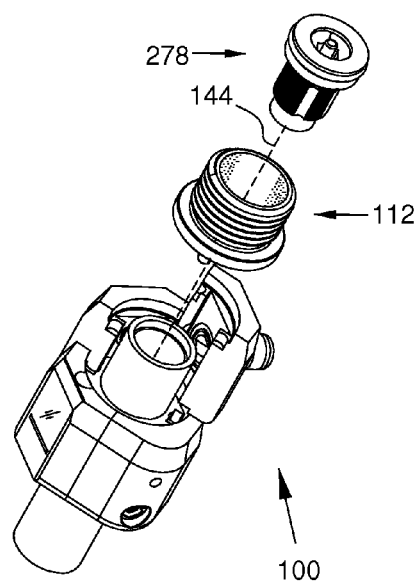
FIG. 2 is a further diagrammatic exploded view of the pressure regulator of FIG. 1, but in a more advanced stage of assembly.
Figure 3:
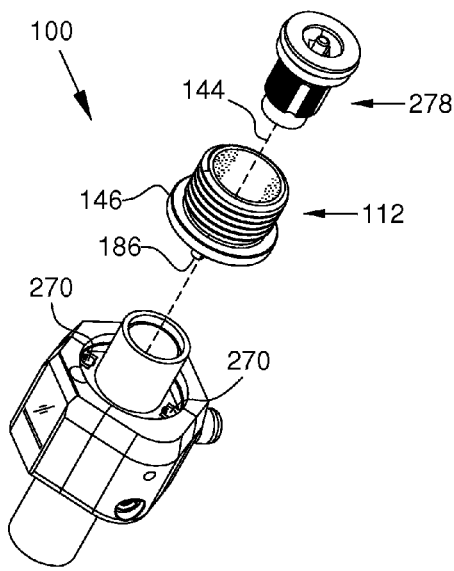
FIG. 3 is a further diagrammatic exploded view of the pressure regulator of FIG. 1, but in an even more advanced stage of assembly.
Figure 4:
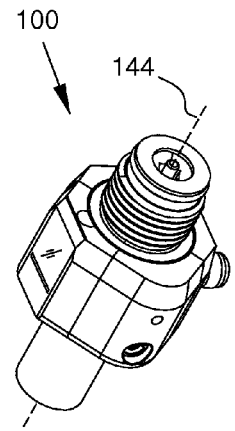
FIG. 4 is a diagrammatic perspective view of the pressure regulator of FIG. 1, but fully assembled.
Figure 5:
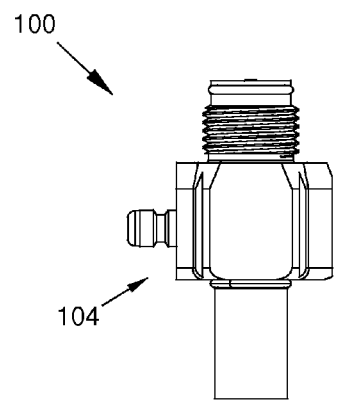
FIG. 5 is a diagrammatic side view of the pressure regulator of FIG. 4.
Figure 6:
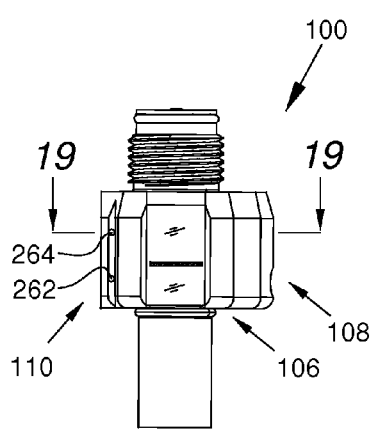
FIG. 6 is a further diagrammatic side view of the pressure regulator of FIG. 4, shown at 90 degrees from the orientation of FIG. 5.
Figure 9:
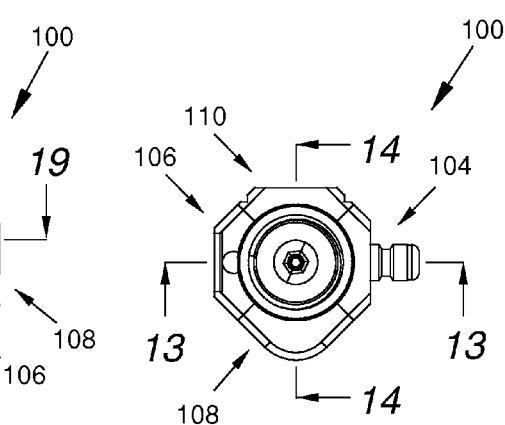
FIG. 9 is a diagrammatic top view of the pressure regulator of FIG. 4.
Figure 7:
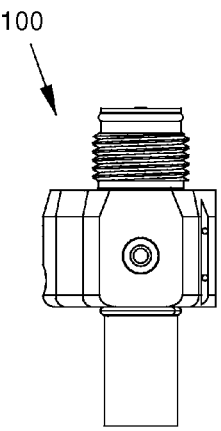
FIG. 7 is a further diagrammatic side view of the pressure regulator of FIG. 4, shown at 90 degrees from the orientation of FIG. 6.
Figure 8:
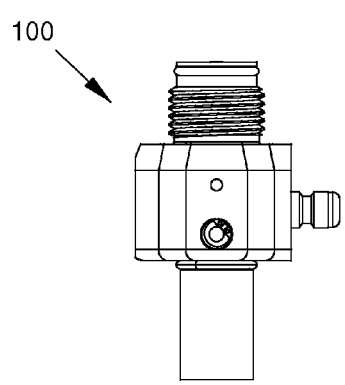
FIG. 8 is a further diagrammatic side view of the pressure regulator of FIG. 4, shown at 90 degrees from the orientation of FIG. 7.
Figure 10:
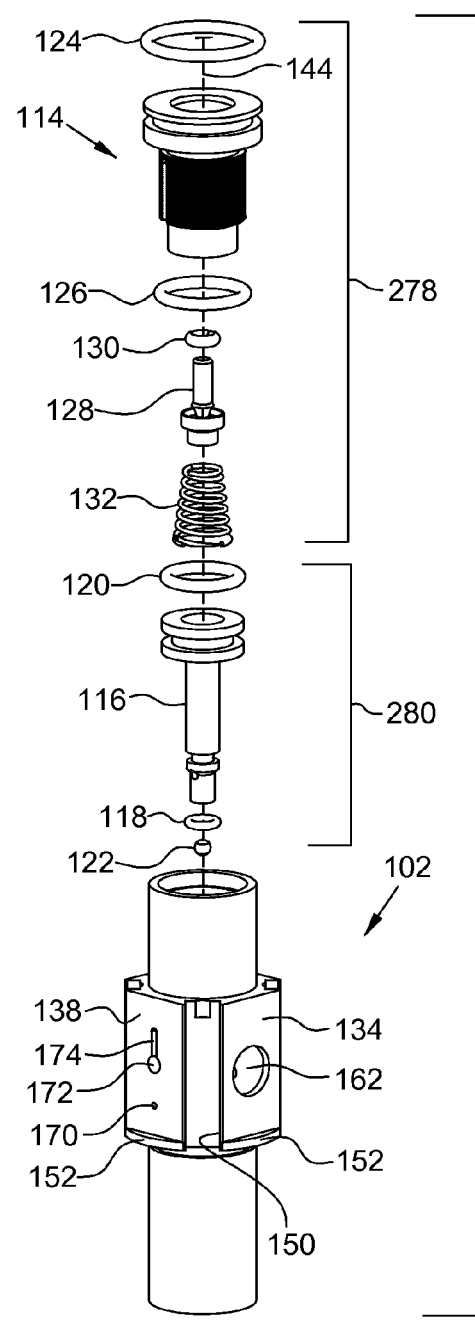
FIG. 10 is a diagrammatic exploded view of the core of a pressure regulator in accordance with the present invention, showing components of a retainer assembly, shuttle assembly and a regulator body.
Figure 11:
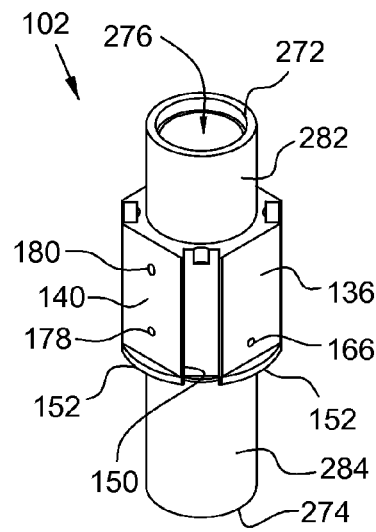
FIG. 11 is a diagrammatic perspective view of the regulator body shown in FIG. 10, but from the opposite side.
Figure 12:
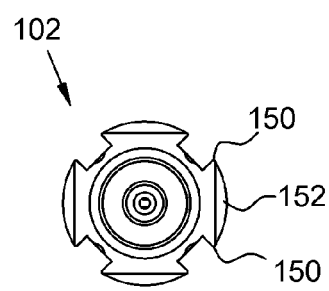
FIG. 12 is a diagrammatic top view of the regulator body shown in FIG. 10, shown with the shuttle assembly inserted within the main bore.

Referring now to the drawings, like reference numerals designate identical or corresponding features throughout the several views.

Referring to FIGS. 1-24, an embodiment of a gas pressure regulator with slide-mount lobes is shown generally at 100, and may comprises one or more of the following components and features:
100 pressure regulator
102 regulator body
104 fill lobe
106 gauge lobe
108 bias lobe
110 relief lobe
112 sleeve
114 retainer
116 shuttle rod
118 high shuttle o-ring
120 low shuttle o-ring
122 shuttle ball seal
124 application o-ring
126 retainer o-ring
128 poppet
130 poppet o-ring
132 poppet spring
134 fill lobe interface
136 gauge lobe interface
138 bias lobe interface
140 relief lobe interface
142 source o-ring
144 main axis
146 sleeve flange
148 retainer flange
150 guide rail
152 axial detent
154 source chamber
156 bias chamber
158 output chamber
160 fill channel
162 fill port
164 gauge channel
166 gauge port
168 bias supply channel
170 bias supply port
172 bias port
174 bias relief channel
176 source-pressure relief channel
178 source-pressure relief port
180 output-pressure relief port
182 source end
184 application end
186 stud
188 threading
190 fill lobe body
192 fill plug
194 flow stopper
196 plug o-ring
198 stopper o-ring
200 guide rail channel
202 gauge lobe body
204 slide-on seal
206 slider ring
208 press-in plug
210 sense pin
212 sense pin top hat
214 gauge spring
216 gauge top plug
218 gauge marker
220 face cover (e.g., translucent or transparent polymer)
222 bias lobe body
224 ball piston
226 piston o-ring
228 piston spring (e.g., Belleville stack)
230 snap ring
232 pilot ball seal
234 pilot o-ring
236 bias relief top plug
238 bias relief spring
240 ball top
242 bias relief ball seal
244 bias relief o-ring
246 bias inlet channel
248 bias relief vent bore
250 pilot valve seat
252 bias relief valve seat
254 relief lobe body
256 high-pressure burst disk
258 low-pressure burst disk
260 burst disk o-ring
262 high-pressure burst vent
264 low-pressure burst vent
266 high-pressure burst chamber
268 low-pressure burst chamber
270 socket (e.g., adapted to receive a stud 186 of sleeve 112)
272 first end
274 second end
276 main bore
278 retainer assembly
280 shuttle assembly
282 first portion
284 second portion An embodiment of a pressure regulator 100 A pressure regulator may comprise a regulator body 102, a shuttle assembly 280 and a multiplicity of service lobes (such as shown, for example, at 104, 106, 108 and 110). A regulator body 102 may have a first end 272, a second end 274, and a main bore 276 extending therebetween along a main axis 144. The second end 274 is generally adapted to be placed and secured in direct fluid communication with a reservoir of pressurized gas (not shown). This securement is typically by way of threadable engagement between a second portion 184 of the regulator body and the neck of the reservoir. The main bore 276 may be adapted to receive the shuttle assembly 280 for axial movement of the shuttle assembly between a fluid release configuration (not shown) and a fluid retention configuration (shown, for example, in FIG. 14). In fluid release configuration, fluid is allowed to pass from the second end 274 into the output chamber 158. In fluid retention configuration, the shuttle assembly 280 prevents pressurized air from flowing from the send end into the output chamber 158.

The main bore 276 is typically further adapted to cooperate with the shuttle assembly 280 to define a bias chamber 156. The regulator body 102 may outwardly include a plurality of lobe interfaces (such as those shown, for example, at 134, 136, 138 and 140) generally radially distributed about the main axis 144. Each of said lobe interfaces may include a respective port (such as those shown, for example at 166, 170 and 178) in fluid communication with the second end 274. As illustrated, for example, in FIGS. 1-4, one or more of the multiplicity of service lobes may be adapted to axially slidably engage a respective lobe interface and be axially releasably restrained thereat. Such slidable engagement may be established between a pair of guide rails 150 on each lobe interface (see, for example, FIG. 12) and a pair of guide rail channels 200 in each respective service lobe (see, for example, FIG. 21).

Certain embodiments may further comprise a sleeve element 112 and a retainer assembly 278. The regulator body 102 may include a first portion 282 at generally the first end 272. The sleeve element 112 may include an externally threaded portion 188 and a radially-extending sleeve flange 146 and may be adapted to receivingly engage the first portion 282. The retainer assembly 278 may include a retainer element 114 adapted to be threadably received by the main bore 276 generally at the first end 272. The retainer element by thereby axially releasably restrain the service lobes in the engagement with the respective interfaces, as well as the sleeve element 112 in receiving engagement with the first end 272.

Figure 13:
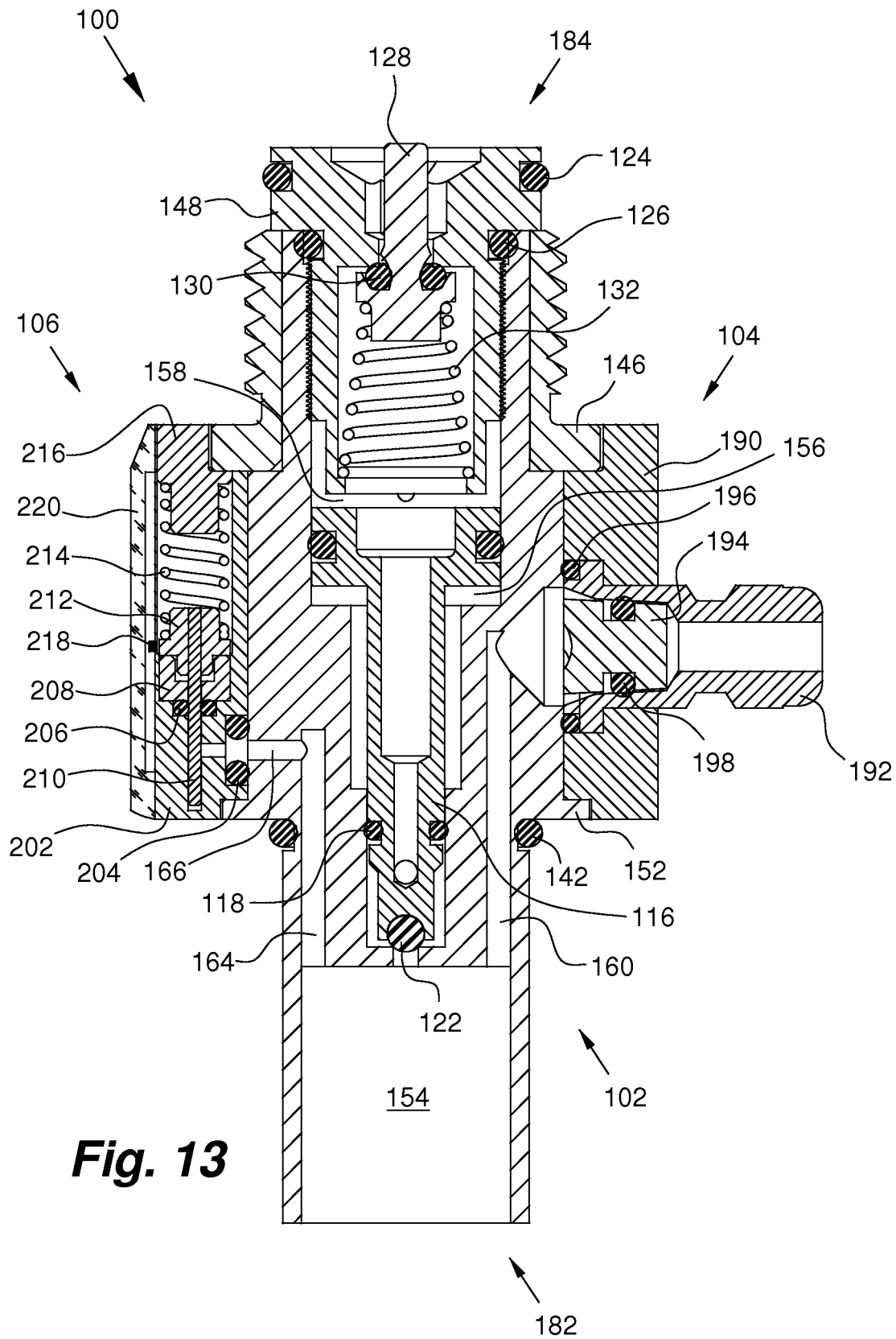
FIG. 13 is a diagrammatic cross-sectional view taken along line 13-13 in FIG. 9.

In particular embodiments, the retainer assembly 278 may further include a poppet 128 and a poppet spring 132, both of which may be axially restrained within the retainer element 114 as shown, for example, in FIG. 13.

Figure 14:
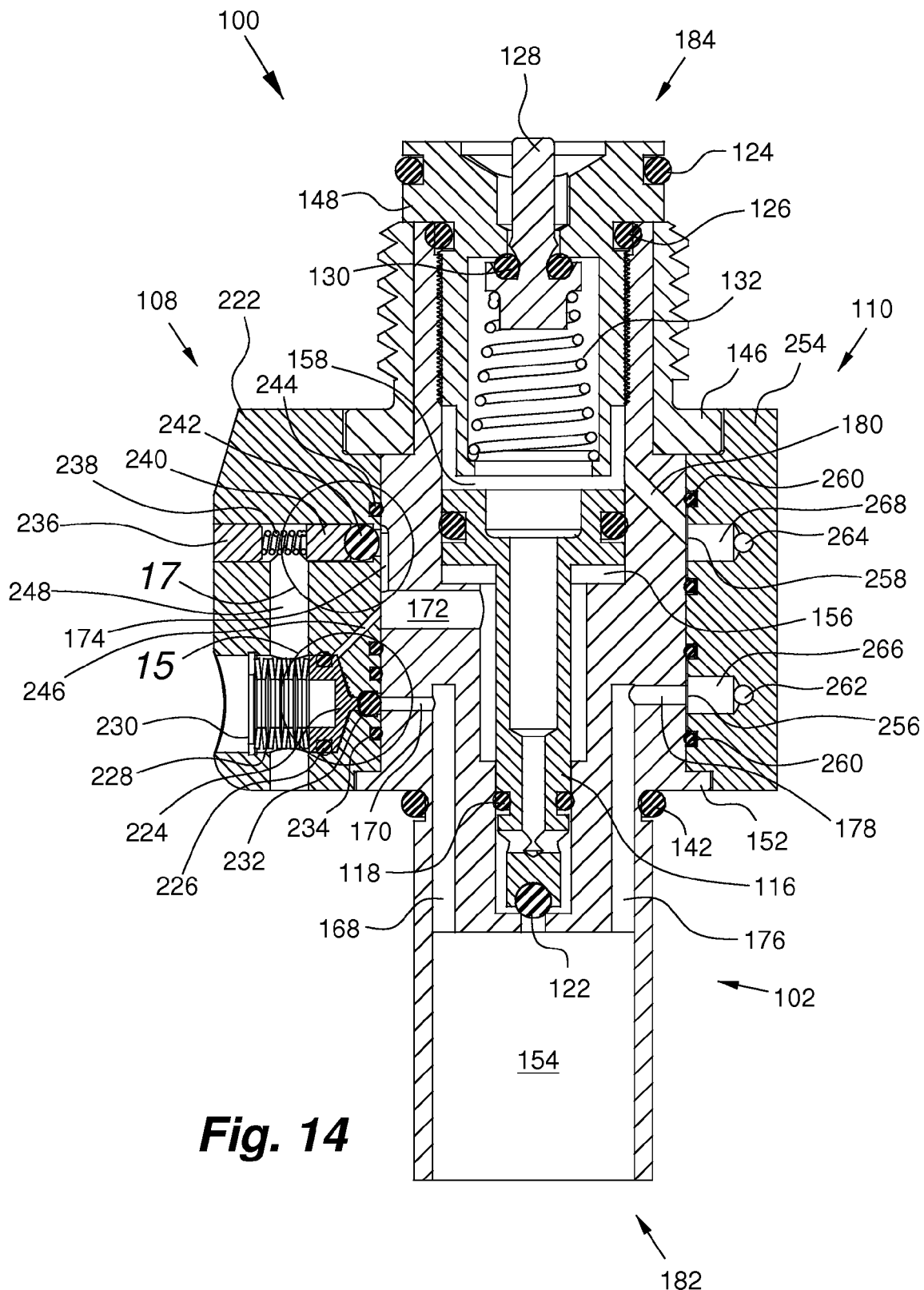
FIG. 14 is a diagrammatic cross-sectional view taken along line 14-14 in FIG. 9.
Figure 15:
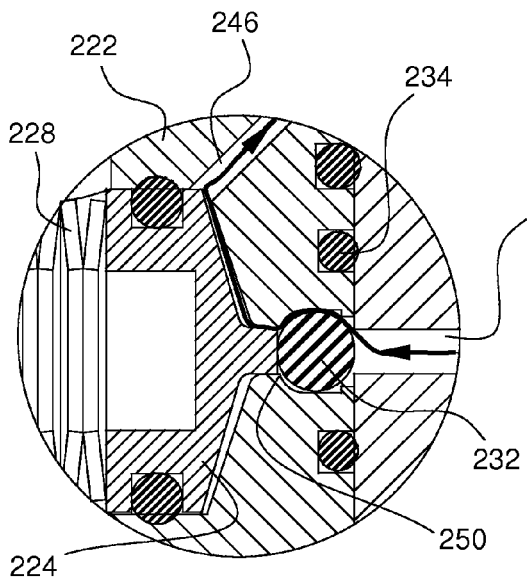
FIG. 15 is a diagrammatic enlarged view of section 15 of FIG. 14, in which the pressure within the source chamber is insufficient to overcome the piston spring enough to allow the pilot ball seal to sealingly engage the pilot valve seat.
Figure 16:
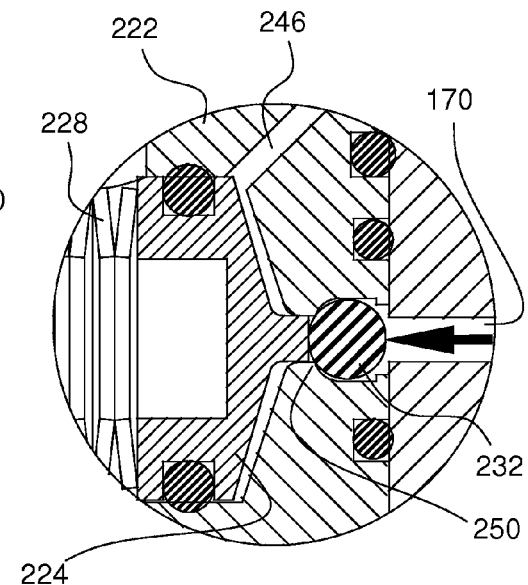
FIG. 16 is a diagrammatic enlarged view of section 15 of FIG. 14, and in which the pressure within the source chamber has become sufficient to overcome the force of the piston spring enough to allow the pilot ball seal to sealingly engage the pilot valve seat.
Figure 17:
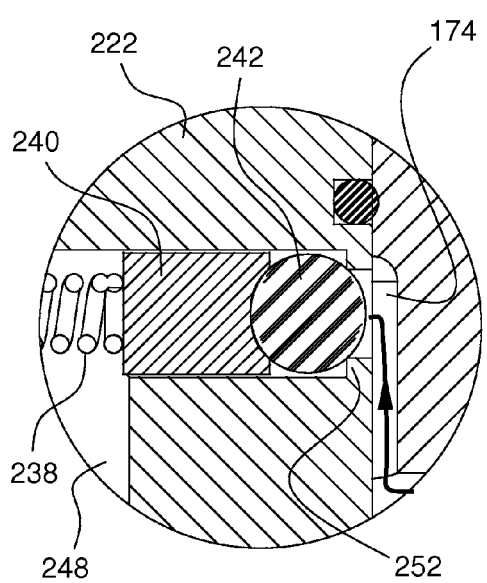
FIG. 17 is a diagrammatic enlarged view of section 17 of FIG. 14, and in which the pressure within the bias chamber is insufficient to overcome the bias relief spring enough to allow the bias relief ball seal to break its seal with the bias relief valve seat.
Figure 18:
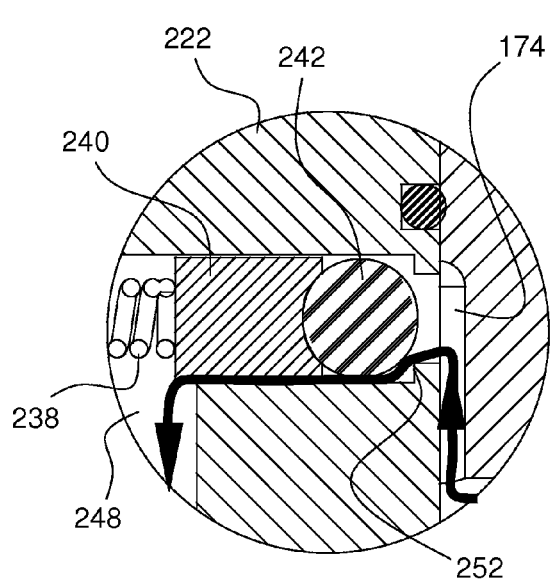
FIG. 18 is a diagrammatic enlarged view of section 17 of FIG. 14, and in which the pressure within the bias chamber is sufficient to overcome the bias relief spring enough to allow the bias relief ball seal to break its seal with the bias relief valve seat.
Figure 19:
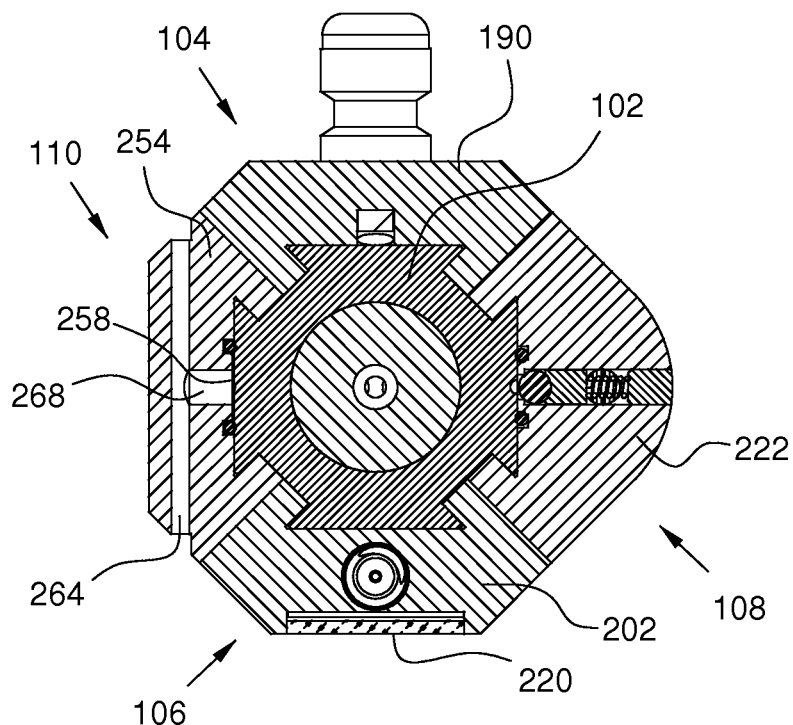
FIG. 19 is a diagrammatic cross-sectional view taken along line 19-19 in FIG. 6.
Figure 20:
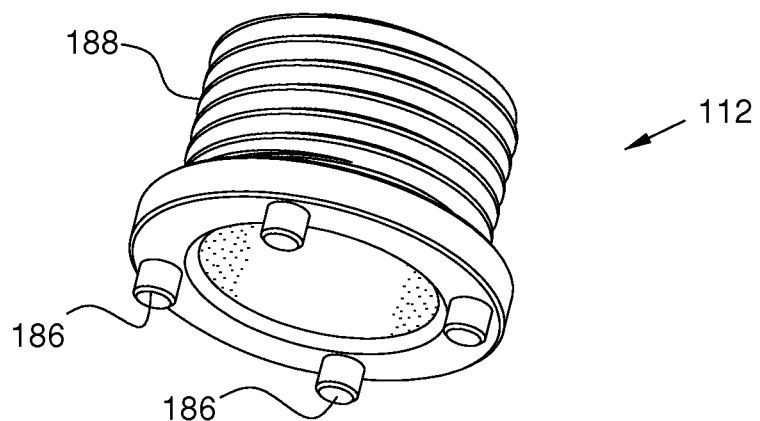
FIG. 20 is a diagrammatic perspective view of a sleeve in accordance with the present invention.
Figure 23:
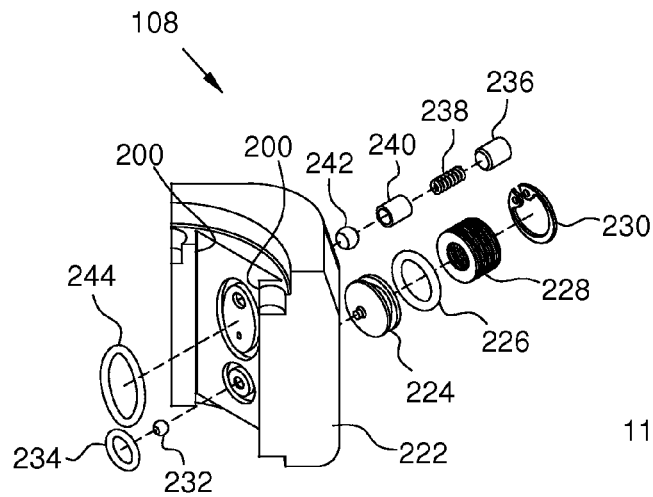
FIG. 23 is a diagrammatic exploded view of a bias lobe in accordance with the present invention.

Referring to FIGS. 14 and 23 for illustration, one of the service lobes may be a bias lobe 108. A bias lobe 108 may include a pilot regulator (comprised of, for example, one or more of a pilot ball seal 232, pilot o-ring 224, piston o-ring 226, piston spring 228 and snap ring 230). The pilot regulator may be adapted to be in fluid communication generally between the second end 274 and the bias chamber 156 and may thereby regulate bias pressure within the bias chamber 156 when the bias lone 108 is in engagement with its respective lobe interface 138.

Figure 22:
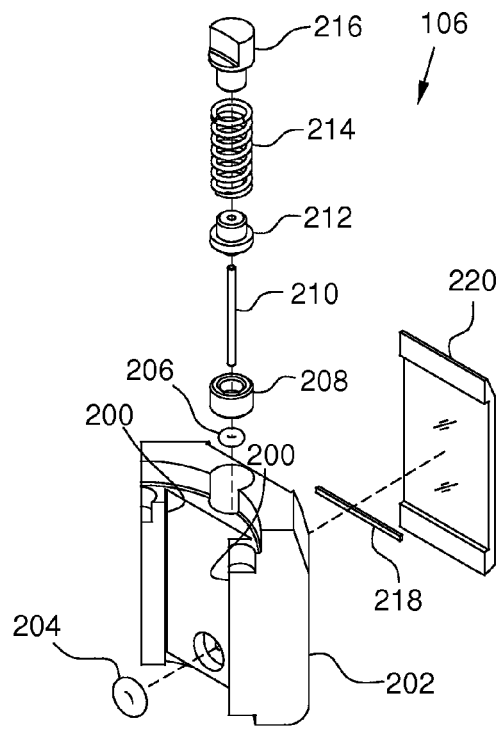
FIG. 22 is a diagrammatic exploded view of a gauge lobe in accordance with the present invention.

Referring to FIGS. 13 and 22 for illustration, one of said service lobes may be a gauge lobe 106. A gauge lobe 106 may include a pressure gauge assembly (comprising one or more of, for example, a slider ring 206, a press-in plug, 208, a sense pin 210, a sense pin top hat 212, a gauge spring 214, a gauge top plug 216, a gauge marker 218 and a face cover 220. The pressure gauge assembly may be adapted to be in pressure-indicating fluid communication with the second end 274 when the gauge lobe 106 is in engagement with its respective lobe interface 136.

Figure 21:
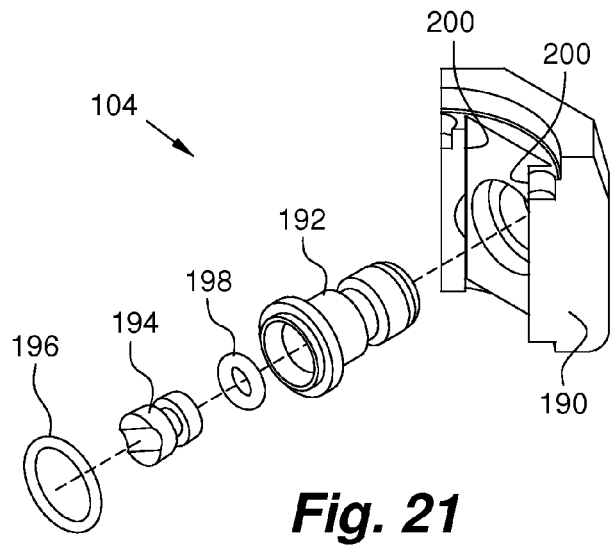
FIG. 21 is a diagrammatic exploded view of a fill lobe in accordance with the present invention.

Referring to FIGS. 13 and 21 for illustration, one of the service lobes may be a fill lobe 104. A fill lobe 104 may include a fill plug 192 adapted to be in fluid communication with the second end 274 when the fill lobe 104 is in engagement with its respective lobe interface 134.

Figure 24:
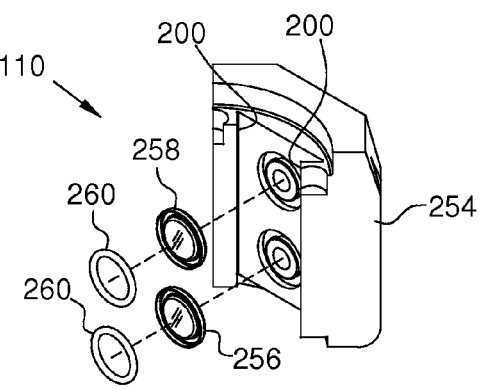
FIG. 24 is a diagrammatic exploded view of a relief lobe in accordance with the present invention.

Referring to FIGS. 14 and 24 for illustration, one of the service lobes may be a relief lobe 110. A relief lobe 110 may include one or both of a high pressure burst disk 256 and a low pressure burst disk 258. A high-pressure burst disk 256 may be adapted to be in fluid communication between the second end 272 and ambient air and a low pressure burst disk 258 may be in fluid communication between the output chamber 158 and ambient air when the relief lobe 110 is in engagement with its respective lobe interface 140.

In certain embodiments, a relief lobe 110 may include a relief lobe body 254 having one or more of a high-pressure burst vent 262 and a low-pressure burst vent in fluid communication with ambient air. The high-pressure burst disk 256 may have a burst direction generally normal thereto (that is, generally normal to the plane of the burst disk) and being in fluid communication between the second end 272 and the high-pressure burst vent 262. As illustrated in FIG. 14, for example, the high-pressure burst vent 262 and low pressure burst vent 264 may extend in a manner substantially non-parallel to the burst direction so as to more effectively deflect fragments from a respective rupturing burst disk.

The portion of the regulator body 102 proximate the source end 182 of the pressure regulator 100 is generally adapted to be secured to a tank or similar structure enclosing a fluid reservoir (not shown). This securement may be by way of, for example, threaded engagement, welding, or the like. The tank or similar structure may be adapted to store fluids, such as gases, within the fluid reservoir at pressures of between 3000 psi and 4500 psi or more. The source chamber 154 of the regulator body 102 is typically placed in direct fluid communication with the fluid reservoir.

The regulator body 102 typically includes radially distributed interfaces, such as one or more of a fill lobe interface 134, gauge lobe interface 136, bias lobe interface 138, and relief lobe interface 140. The fill lobe 104, gauge lobe 106, bias lobe 108 and relief lobe 110 are each adapted to slidably engage a respective interface. This slidable engagement may occur between respective guide rails 150 and guide rail channels 200. Each lobe may be axially secured with respect to the regulator body 102 by securement between a respective axial detent 152 and sleeve flange 146. The studs 270 on the sleeve 112 may be adapted to be received by the sockets 270 so as to prevent the rotation of the sleeve 112 about the main axis 144 when the pressure regulator 100 is fully assembled. The sockets 270 may be formed by cooperation of the lobes and regulator body 102 when in their mutually assembled state. The sleeve 112 may be adapted to be axially secured with respect to the regulator body 102 by threaded engagement of the retainer 114 to the regulator body 102. The retainer 114 may be adapted to securely house all components of the retainer assembly 278, even when the retainer is removed from threaded engagement with the regulator body 102.

The regulator body 102 may be adapted to axially receive and house a shuttle assembly 280 for axial movement between fluid release and fluid retention configurations, thereby regulating the pressure of a fluid within output chamber 158, the source of that fluid may be the source chamber 154 at the second end 272. The shuttle assembly 280 is shown in fluid retention configuration in FIGS. 13 and 14, wherein shuttle ball seal 122 prevents fluid from passing from the source chamber 154 to the output chamber 158. The shuttle assembly 280 is considered to be in fluid release configuration when it has moved toward the application end 184 of the pressure regulator 100, thereby allowing fluid to pass from the source chamber 154 into the output chamber 158. The engagement between the regulator body 102 and the shuttle assembly 280 may form a bias chamber 156. Pressurization of the bias chamber 156 (e.g., to a pre-determined "bias pressure") results in the shuttle assembly 280 being elastically biased toward its fluid release configuration. This elastic bias may be adapted to be overcome once the pressure in the output chamber 158 reaches or exceeds a pre-determined desired output pressure (for example, 800 psi), resulting the shuttle assembly 280 being forced back to its fluid retention configuration. The bias pressure is typically a fraction of the output pressure.

The bias lobe 108 may include a pilot regulator which regulates the bias pressure of the fluid within the bias chamber 156, wherein the fluid is supplied from the source chamber 154. Operation of the pilot regulator is illustrated in part, for example, in FIGS. 15 and 16. The pilot regulator may be resiliently biased to allow pressurized fluid to flow from the source chamber to the bias chamber 156 (see, for example, FIG. 15) until the proper bias pressure is achieved within the bias chamber 156, at which point the pressure on the face of the ball piston 224 results it the ball piston 224 moving against the resilient bias of the piston spring 228 sufficiently to allow the pilot ball seal 232 to sealingly engage the pilot valve seat 250 (see, for example, FIG. 16). The proper bias pressure may be a fraction of the output pressure, for example, approximately 20%-40%, depending on the particular embodiment. The bias lobe 108 also comprises a bias pressure relief system (illustrated in part for example, in FIGS. 17 and 18) which is a safety mechanism adapted to relieve any excess pressure which may accumulate within the bias chamber 156. Such excess pressure may result from, for example, a change in the temperature of the operating environment.

The bias pressure within the bias chamber 156 provides a bias force on the shuttle 116, thereby elastically biasing the shuttle 116 (and the shuttle assembly 280 as a whole) in the direction toward the application end 184 of the regulator 100. This "regulated gas spring" solution may eliminate the need for a conventional compression spring to be used to achieve proper output pressure, while simultaneously providing a more consistent bias force during the operation and over the life of the regulator.

In embodiments, the fill lobe may be adapted to be assembled without the need for threaded engagement of the fill plug 192. The relief lobe 110 may include a high-pressure burst disk 256 and a low pressure burst disk 258, adapted to relieve excess pressure from the source chamber 154 and output chamber 158, respectively. The relived fluid and burst disk fragments may be further deflected by way of high and low-pressure burst vents 262 and 264, respectively. The gauge lobe 106 provides a clear indicator of the pressure within the source chamber 154, and resultantly, the pressure within the attached fluid reservoir. The gauge marker 218 may move axially along with the sense pin top hat 212 by way of, for example, magnetic interaction.

Potential advantages of embodiments of the disclosed pressure regulator 100 include the fact that it may be assembled and disassembled using only one tool (e.g., an Allen key used on retainer 114), it may have a built-in pressure indicator, it may not rely on a conventional compression spring to provide bias to the shuttle rod 116 (compression springs can perform inconsistently, particularly over time and at different temperatures), the fill plug 192 may be easily secured with respect to the pressure regulator 100 without being required to threadedly engage the regulator body 102 or any other body, and when removing the retainer 114 from the regulator body 102, the poppet spring 132 and poppet 128 may remain neatly within the retainer 114. In addition, the gauge lobe body 202 and the relief lobe body 254 can be made of fiber-infused Nylon rather than, for example, Aluminum or other metals.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A pressure regulator comprising:
a regulator body, a shuttle assembly, a fill lobe, a bias lobe, a relief lobe, and a gauge lobe, said regulator body having a first end, a second end, and a main bore extending therebetween along a main axis, said second end being adapted to be placed in fluid communication with a reservoir of pressurized gas, said shuttle assembly being received within said main bore for axial movement between a fluid release configuration and a fluid retention configuration, said main bore cooperating with said shuttle assembly to define a bias chamber, and cooperating with said shuttle assembly and retainer assembly to define an output chamber, said regulator body outwardly including a plurality of lobe interfaces generally radially distributed about said main axis, each said lobe interface including a respective port in fluid communication with said second end, each of said lobes being axially slidably engaged with a respective said lobe interface and axially releasably restrained thereat, said bias lobe including a pilot regulator in fluid communication generally between said second end and said bias chamber for regulating a bias pressure within said bias chamber, said relief lobe including a high-pressure burst disk in fluid communication between said second end and ambient air, said gauge lobe including a pressure gauge assembly in pressure-indicating fluid communication with said second end, and said fill lobe including a fill plug in fluid communication with said second end.

2. A pressure regulator as defined in claim 1 further comprising a sleeve element and a retainer assembly, said regulator body including a first portion at generally said first end, said sleeve element including an externally threaded portion and a radially-extending sleeve flange and being in receiving engagement with said first portion, said retainer assembly including a retainer element threadably received by said main bore generally at said first end and thereby axially releasably restraining said fill lobe, bias lobe, relief lobe and gauge lobe in said engagement with said respective lobe interfaces and axially releasably restraining said sleeve element in said receiving engagement with said first portion.

3. A pressure regulator as defined in claim 1 in which said relief lobe further includes a low pressure burst disk in fluid communication between said output chamber and ambient air.

4. A pressure regulator as defined in claim 3 in which said relief lobe includes a relief lobe body having a high-pressure burst vent and a low-pressure burst vent in fluid communication with ambient air, said high-pressure burst disk having a burst direction generally normal thereto and being in fluid communication between said second end and said high-pressure burst vent, said low-pressure burst disk being in fluid communication between said output chamber and said low-pressure burst vent, said high-pressure and low-pressure burst vents each extending in a manner substantially non-parallel to said burst direction.

5. A pressure regulator as defined in claim 1 in which said slidable engagement is established between a pair of guide rails on each lobe interface and a pair of guide rail channels in each respective lobe.

6. A pressure regulator as defined in claim 1 in which said relief lobe includes a relief lobe body and said gauge lobe includes a gauge lobe body, at least one of said relief lobe body and said gauge lobe body being made substantially of fiber-infused Nylon.

7. A pressure regulator comprising:
a regulator body, a shuttle assembly and a multiplicity of service lobes, said regulator body having a first end, a second end, and a main bore extending therebetween along a main axis, said second end being adapted to be placed in direct fluid communication with a reservoir of pressurized gas, said main bore being adapted to receive said shuttle assembly for axial movement thereof between a fluid release configuration and a fluid retention configuration, said main bore being further adapted to cooperate with said shuttle assembly to define a bias chamber, said regulator body outwardly including a plurality of lobe interfaces generally radially distributed about said main axis, each said lobe interface including a respective port in fluid communication with said second end, each of said multiplicity of service lobes being adapted to axially slidably engage a respective said lobe interface and be axially releasably restrained thereat, said slidable engagement being established between a pair of guide rails on each lobe interface and a pair of guide rail channels in each respective service lobe.

8. A pressure regulator comprising:
a regulator body, a shuttle assembly and a multiplicity of service lobes, said regulator body having a first end, a second end, and a main bore extending therebetween along a main axis, said second end being adapted to be placed in direct fluid communication with a reservoir of pressurized gas, said main bore being adapted to receive said shuttle assembly for axial movement thereof between a fluid release configuration and a fluid retention configuration, said main bore being further adapted to cooperate with said shuttle assembly to define a bias chamber, said regulator body outwardly including a plurality of lobe interfaces generally radially distributed about said main axis, each said lobe interface including a respective port in fluid communication with said second end, each of said multiplicity of service lobes being adapted to axially slidably engage a respective said lobe interface and be axially releasably restrained thereat, one of said service lobes being a bias lobe, said bias lobe including a pilot regulator adapted to be in fluid communication generally between said second end and said bias chamber and thereby regulate a bias pressure within said bias chamber when said bias lobe is in said engagement with its respective said lobe interface.

9. A pressure regulator comprising:
a regulator body, a shuttle assembly and a multiplicity of service lobes, said regulator body having a first end, a second end, and a main bore extending therebetween along a main axis, said second end being adapted to be placed in direct fluid communication with a reservoir of pressurized gas, said main bore being adapted to receive said shuttle assembly for axial movement thereof between a fluid release configuration and a fluid retention configuration, said main bore being further adapted to cooperate with said shuttle assembly to define a bias chamber, said regulator body outwardly including a plurality of lobe interfaces generally radially distributed about said main axis, each said lobe interface including a respective port in fluid communication with said second end, each of said multiplicity of service lobes being adapted to axially slidably engage a respective said lobe interface and be axially releasably restrained thereat, one of said service lobes being a gauge lobe, said gauge lobe including a pressure gauge assembly adapted to be in pressure-indicating fluid communication with said second end when said gauge lobe is in said engagement with its said respective lobe interface.

\* \* \* \* \*